United States Patent
Ducloux et al.

[11] Patent Number: 5,947,459
[45] Date of Patent: Sep. 7, 1999

[54] PRECISE ADJUSTMENT OF A MACPHERSON STRUT: ADJUSTMENT MEANS ON THE STRUT AND MEASURING BENCH

[75] Inventors: Antoine Ducloux, La Roche-Blanche; Jack Faure, Royat; Jacques Foulquier, Cebazat; Thierry Orsat, Clermont-Ferrand, all of France

[73] Assignee: Compagnie Générale des Etablissements Michelin—Michelin & Cie, Clermont-Ferrand Cedex, France

[21] Appl. No.: 08/769,713

[22] Filed: Dec. 18, 1996

[30] Foreign Application Priority Data

Dec. 19, 1995 [FR] France ................................. 95 15891
Mar. 26, 1996 [FR] France ................................. 96 03921

[51] Int. Cl.⁶ ........................... B60G 11/52; B60G 13/00
[52] U.S. Cl. .................. 267/221; 267/34; 280/124.147; 280/124.155
[58] Field of Search .......................... 267/33–35, 64.25, 267/221; 280/124.145–124.147, 124.154, 124.155, 124.179

[56] References Cited

U.S. PATENT DOCUMENTS

| | | |
|---|---|---|
| 3,573,880 | 4/1971 | Sakai . |
| 4,026,578 | 5/1977 | Mattson . |
| 4,424,697 | 1/1984 | Carver . |
| 4,800,751 | 1/1989 | Kobayashi et al. . |
| 4,863,187 | 9/1989 | Artz . |

FOREIGN PATENT DOCUMENTS

| | | |
|---|---|---|
| 0092066 | 10/1983 | European Pat. Off. . |
| 2641741A1 | 7/1990 | France . |
| 3312453A1 | 10/1984 | Germany . |
| 4102742 | 8/1991 | Germany . |
| 01090807 | 4/1989 | Japan . |
| 2100681 | 1/1983 | United Kingdom . |

*Primary Examiner*—Chris Schwartz
*Attorney, Agent, or Firm*—Baker & Botts, L.L.P.

[57] ABSTRACT

The strut comprises a ball bearing (42) located below the lower retainer (41) of the spring (4). The ball bearing (42) is centered on an eccentric collar (27) in order to shift the center of the ball bearing (42) by a distance e from the axis of the shock absorber. Rotation between the body (2) of the shock absorber and the hub holder (5) displaces the center of the ball bearing (42), which shifts the lower retainer (41) accordingly. Using a suitable measuring bench, the strut is adjusted precisely upon the assembling thereof.

10 Claims, 17 Drawing Sheets

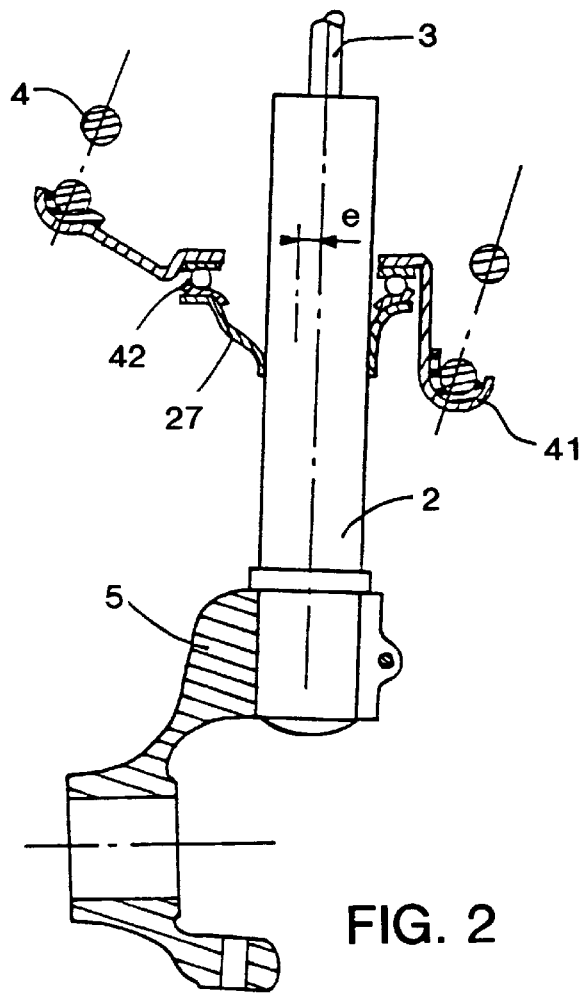
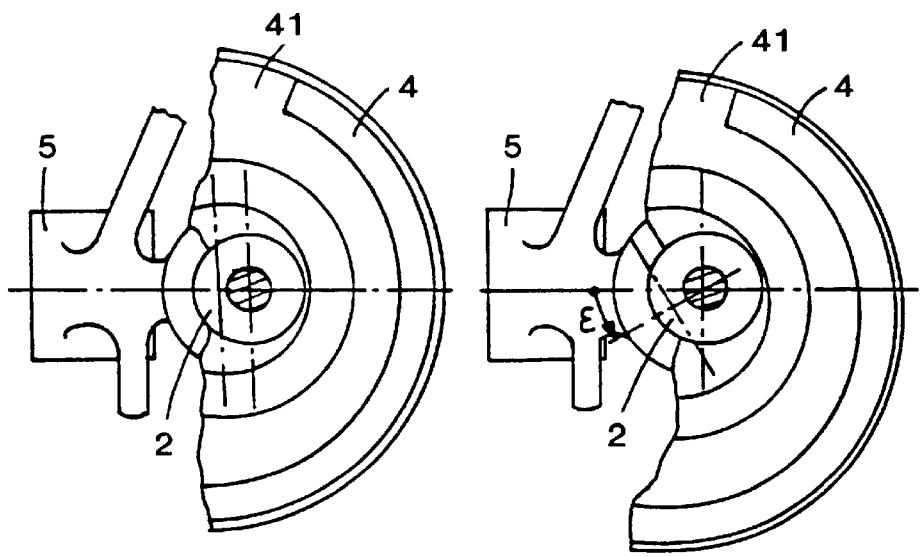
FIG. 2
FIG. 3
FIG. 4

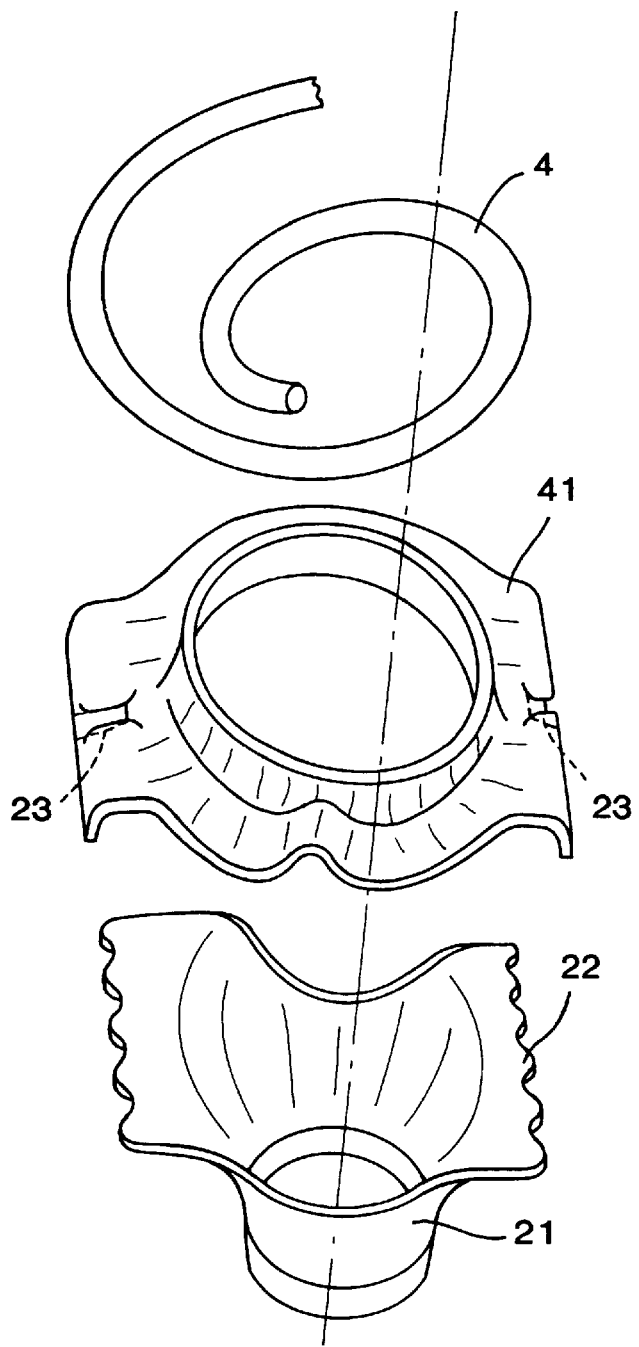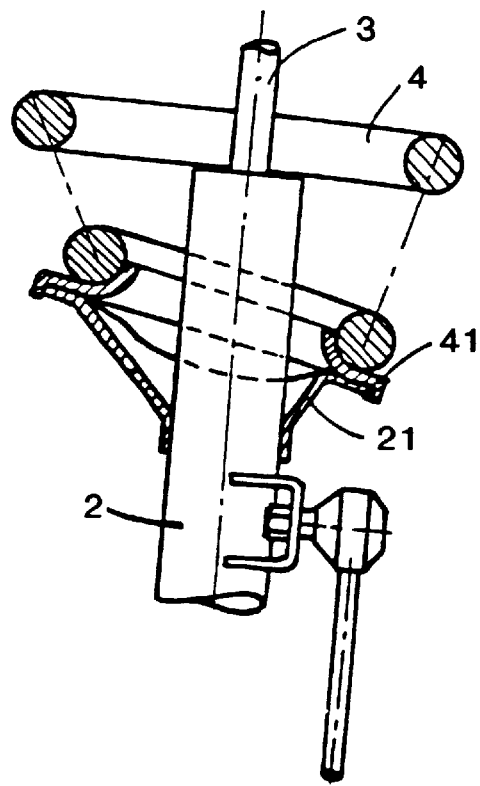
FIG. 18
FIG. 19

PRECISE ADJUSTMENT OF A MACPHERSON STRUT: ADJUSTMENT MEANS ON THE STRUT AND MEASURING BENCH

BACKGROUND OF THE INVENTION

The present invention relates to a MacPherson-type suspension shown in FIG. 1 in which a strut 1 formed essentially of a shock absorber participates in the steering of the wheel.

The shock absorber comprises a body 2 and a rod 3. The upper end 30 of the rod rests on the body of the vehicle on an articulation point 31 formed, in general, by an elastic articulation. A coil spring 4 is mounted between an upper retainer 40 and a lower retainer 41. The lower retainer 41 rests on the body 2 of the shock absorber, and the upper retainer 40 rests on the body of the vehicle, in general also via a filtering effected by said elastic articulation, which filtering can, in certain cases, be the same for the spring and for the shock absorber.

The body 2 is firmly attached to a hub holder 5. There is therefore no degree of freedom between the body 2 and the hub holder 5. A lower arm 6 is articulated on one side on the body of the vehicle and on the other side on the hub holder 5 by the articulation 65. The hub holder 5 supports a hub 50 on which there is mounted a wheel 51 equipped with its tire 52.

In the zone of attachment to the body, the strut 1 exerts forces on the body, coming both from the spring and from the shock absorber. Although the exact point of application of these forces is difficult to locate and depends in particular on the specific construction of the strut 1, it is known that the mastering of the shearing force which the rod 3 of the shock absorber undergoes is determinative for the proper operation of suspensions of this type.

In order to simulate a MacPherson suspension, one can consider the reaction $\vec{R}$ of the body of the vehicle on the strut. Its direction passes through the point C, the latter being defined by the intersection of the force $\vec{B}$ exerted by the lower arm 6 on the articulation 65 and the resultant of the force $\vec{S}$ which the ground exerts on the tire 52. In first approximation, the vehicle being stationary, said resultant force $\vec{S}$ is directed vertically and passes through the center of the contact area of the tire (the value of this force upon travel in a straight line with stabilized speed depends on the characteristics of the tire and the adjustments of the geometry of the front axle). The intersection of $\vec{B}$ and $\vec{S}$ gives the point C. The reaction $\vec{R}$ is divided between the thrust $\vec{P}$ of the spring and a shearing force $\vec{T}$ applied to the rod 3 of the shock absorber in a direction perpendicular to said rod 3, so that the relationship $\vec{R} = \vec{T} + \vec{P}$ (vector sum) applies.

In order to obtain good operation of the strut (no or little dry friction, minimum wear, etc.), it is known that it is advisable to control the shearing force $\vec{T}$ applied to the rod 3 very closely. For this purpose, it has already been proposed to incline the axis of the spring 4 with respect to the axis of the rod 3, as shown in the drawing. Thus, practically all the MacPherson suspensions used at the present time comprise a spring, the axis of which is not identical with the axis of the rod of the shock absorber. The inclination of this spring 4 has been calculated in order to minimize the shearing force on the rod 3.

Furthermore, research has shown that the resultant of the forces exerted by the spring can exert a torque Cp around the pivot axis, defined by the point of articulation 31 and the center 66 of the articulation 65. This torque acts on the equilibrium of the steering system. In order to obtain good operation of the steering system, it is necessary suitably to control (for instance minimize) the combined effect of the torques Cp coming from the right and left struts.

Unfortunately, numerous vehicles still suffer today from poor suspension and/or steering characteristics. The dynamic behavior of a vehicle depends on a considerable number of parameters, some of which have an influence which is still poorly known but which may nevertheless be preponderant. The result is that even when the designer has duly respected all the rules of the art in designing the suspension, the result is not always up to the effort put into the design.

SUMMARY OF THE INVENTION

The present invention proposes means which permit the optimizing in practice of each of the vehicles manufactured in series. In fact, it has been found that the inevitable dispersions in the characteristics of all of the components of the suspension, and more precisely of the strut, could cause rather substantial variations in behavior from one vehicle to another. The invention proposes elements necessary for the optimizing and a method of optimizing the distribution of the reaction $\vec{R}$ between the thrust $\vec{P}$ of the spring 4 and the shearing force $\vec{T}$ in the rod 3, as well as of the torque Cp exerted by the spring around the pivot axis.

The invention proposes that in a strut comprising a spring, the inclination of which has been previously calculated in such a manner that the residual shearing force $\vec{T}$ is optimized, for instance made as small as possible, there be introduced elements which make it possible to adjust the value of this residual shearing force $\vec{T}$ or the torque Cp more precisely. In this way, it becomes possible to take into account dispersions in characteristics, particularly of the springs, which seem to be responsible for very substantial dispersions of the shearing force $\vec{T}$ and of the torque Cp actually obtained on series vehicles.

The object of the invention is to be able to control the locating of the centers of thrust of the spring on the upper retainer and on the lower retainer, as well as the orientation of said thrusts, without acting on the customary geometrical parameters of a suspension, which are the angle of camber, the angle of inclination of the pivot, and the caster angle, which remain unchanged.

The invention proposes a strut for a MacPherson-type suspension comprising a shock absorber provided with a body and a rod, said strut having a coil spring surrounding said rod, comprising a lower retainer supported by the body of the shock absorber, said lower retainer having a lower seat which receives one of the ends of said spring, and an upper retainer intended to rest on the body of the vehicle, possibly via a connecting member, said upper retainer having an upper seat which receives the other end of said spring, said upper retainer being traversed by said rod, the shock absorber body having a coupling surface for a hub holder cooperating with coupling means, said hub holder defining an axis of rotation of said wheel, said coupling means imposing a predetermined azimuthal position between the body and the hub holder, characterized by the fact that said strut comprises means for adjusting the relative position of the axis of the spring with respect to said coupling surface.

DESCRIPTION OF THE DRAWINGS

The invention will be better understood from the following description of an example, given by way of illustration and not of limitation, read with reference to the accompanying drawing, in which:

FIGS. 2 to 4 and 8 to 12 illustrate adjustment of the suspension by eccentric displacement of the lower retainer with respect to the axis of the rod of the shock absorber;

FIGS. 18 to 21 illustrate an adjustment which acts by translation of the lower retainer with respect to the axis of the shock absorber rod;

DESCRIPTION OF PREFERRED EMBODIMENTS

Figure 1:
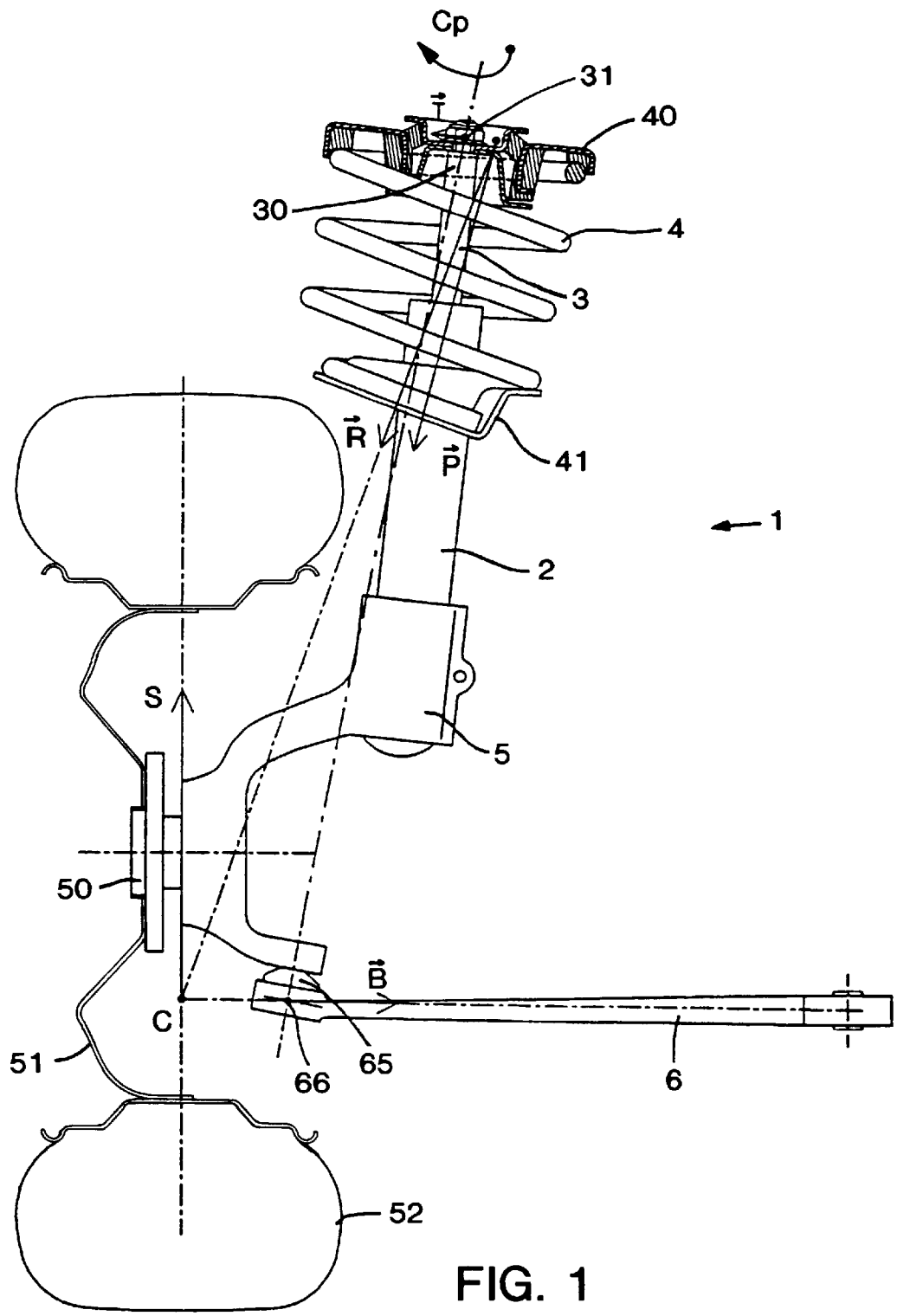
FIG. 1 shows a MacPherson suspension.

FIGS. 2 to 7 describe struts for which the adjustment is effected by relative rotation of the body 2 of the shock absorber with respect to the hub holder 5. In this case, the means of coupling to a hub holder comprise indexing means (that is to say, reference means) for the relative orientation of the body of the shock absorber with respect to the hub holder, said indexing means being arranged on or in the vicinity of the coupling surface. It is, for instance, a graduated sector which makes it possible to index and change the relative position of the body 2 with respect to the hub holder 5. The relative angular position and/or the eccentricity of the lower retainer is thus controlled.

Before describing the adjustment means, we may point out that, in the case of steering wheels, the strut comprises a ball bearing 42, shown in FIGS. 2, 5, 6, 8 to 14, 22, 23 and 26 to 30, the purpose of which is so that the turning of the wheel is not prevented by the spring 4.

In the case of a strut in which the ball bearing 42 is located below the lower retainer 41 of the spring 4, the ball bearing 42 is centered on an eccentric collar 27 in order to shift the center of the ball bearing 42 by an amount e with respect to the axis of the shock absorber 2 (FIGS. 2 to 4). By comparing FIGS. 3 and 4, it is seen that a rotation ϵ between the body 2 of the shock absorber and the hub holder 5 displaces the center of the ball bearing 42, which shifts the lower retainer 41 accordingly.

Figures 5, 6:
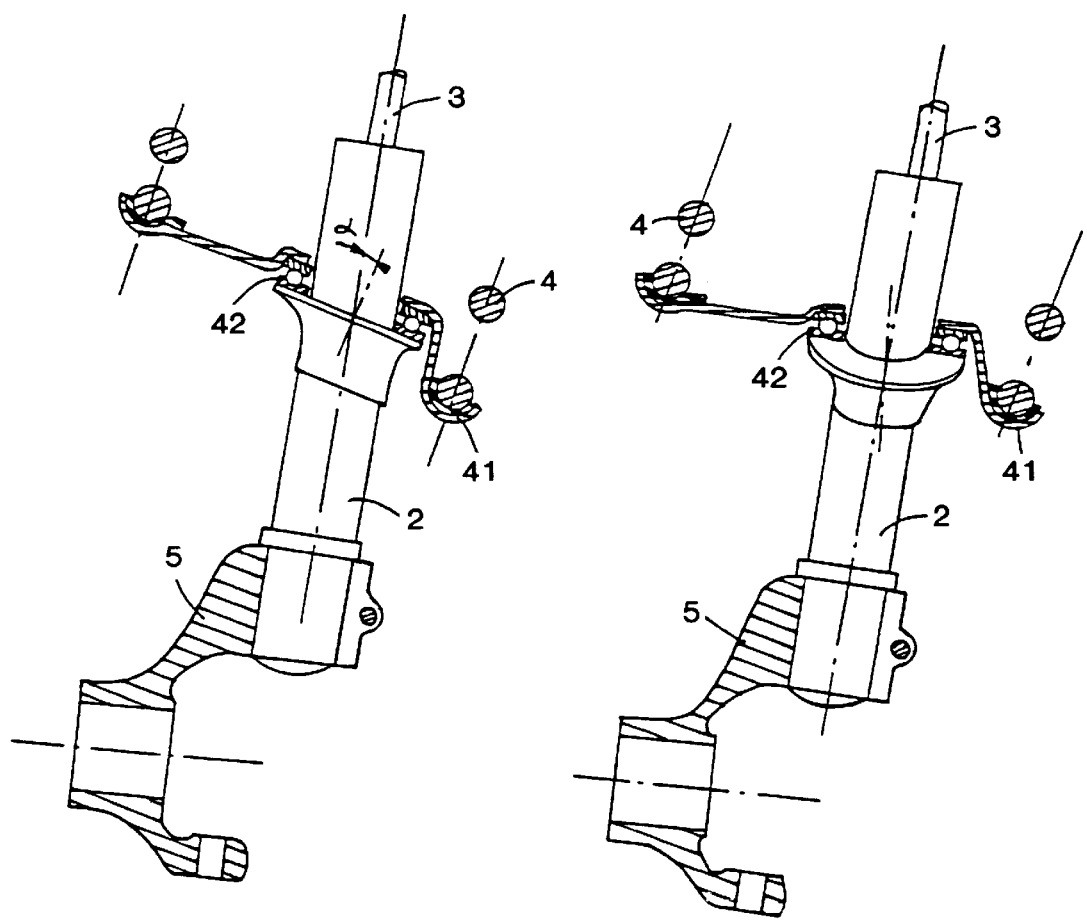
FIGS. 5 to 7 and 13 to 15 illustrate an adjustment by variation of the inclination of the lower retainer with respect to the orientation of the rod of the shock absorber.
Figure 7:
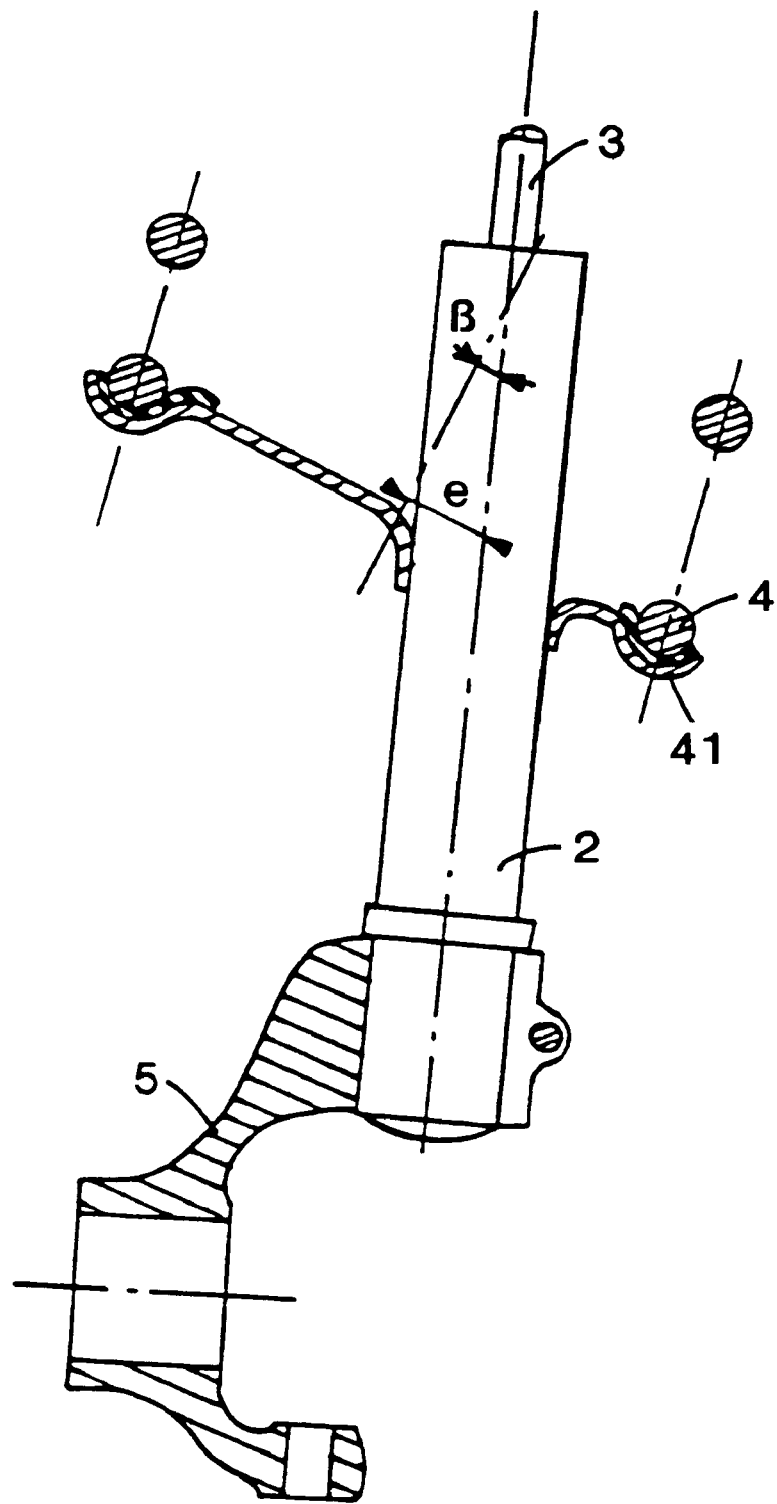

FIG. 5 illustrates a strut the ball bearing 42 of which, also located below the lower retainer 41, is inclined so that the normal to the resting surface of the lower retainer forms an angle $\alpha$ with respect to the axis of the rod 3. FIG. 6 shows that, by relative rotation of the body 2 with respect to the hub holder 5, the orientation of the axis of the ball bearing 42 and the position of the spring 4 on the lower retainer 41 are varied. The combination of the eccentricity e and the inclination $\alpha$ can also be used.

In the case of a rear axle strut, or of a front axle strut in which the ball bearing 42 is located above the upper retainer of the spring (FIG. 7), the lower retainer 41 of the spring 4 is integral with the body 2 of the shock absorber. The axis of the lower retainer is inclined by an angle $\beta$ with respect to the axis of the shock absorber body 2 and/or eccentric by a distance e with respect to the axis of the shock absorber body 2. Here also, the adjustment consists in angularly orienting the body 2 of the shock absorber with respect to the hub holder 5. The modification of said orientation makes it possible to change the position of the lower retainer 41 with respect to the upper retainer and thus to adjust the direction of thrust of the spring 4.

Figure 8:
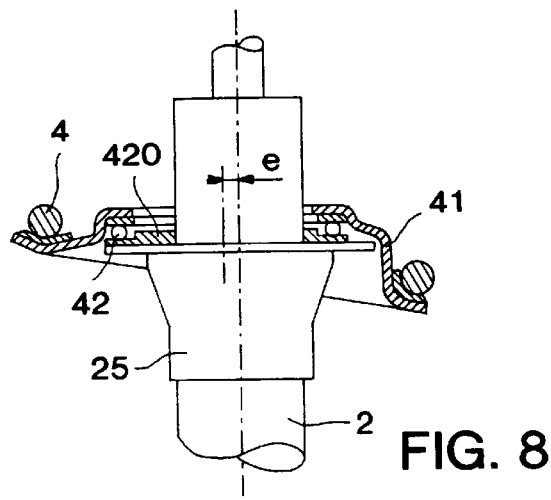
Figure 11:
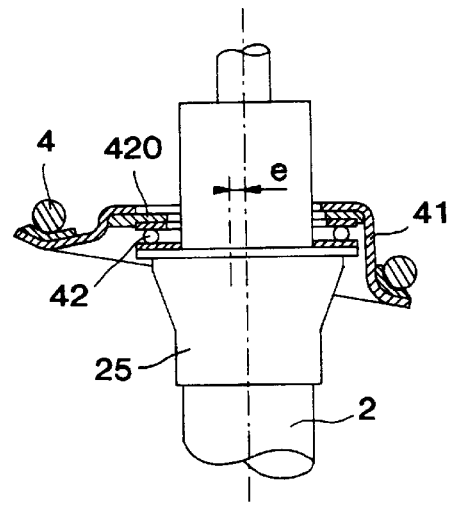
Figure 9:
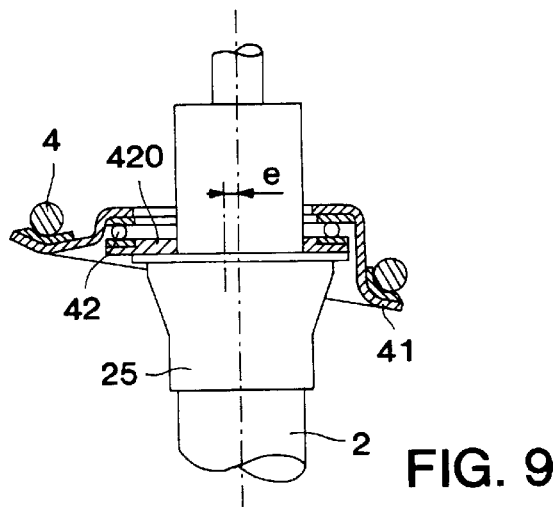
Figure 12:
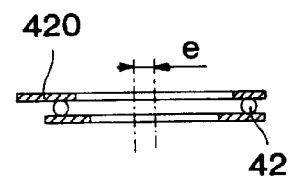
Figure 10:
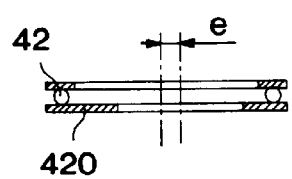

FIGS. 8 to 12 illustrate an adjustment by rotation of an eccentric: the lower retainer 41 is mounted on the shock absorber body 2 via an eccentric 420 which is adjustable in rotation. The eccentric can be part of the ball bearing 42 (FIGS. 10 and 12) or be independent of it (FIGS. 8, 9 and 11). The rotation of the eccentric 420 with respect to the body 2 (FIGS. 8 and 9), or the rotation of the eccentric with respect to the retainer 41 (FIG. 11), displaces the retainer 41 with respect to the body 2. One could also mount the upper retainer on the body via a connecting member provided with an eccentric.

Figure 13:
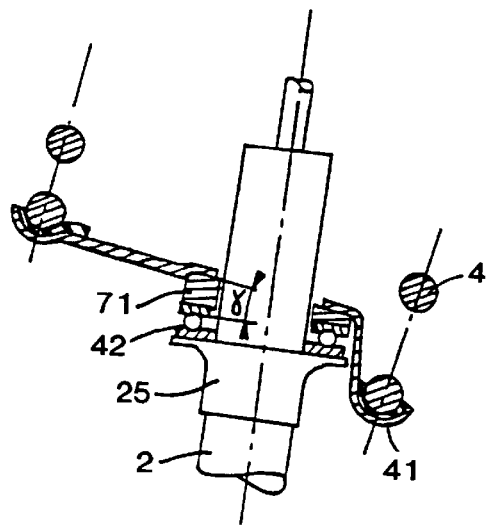
Figure 14:
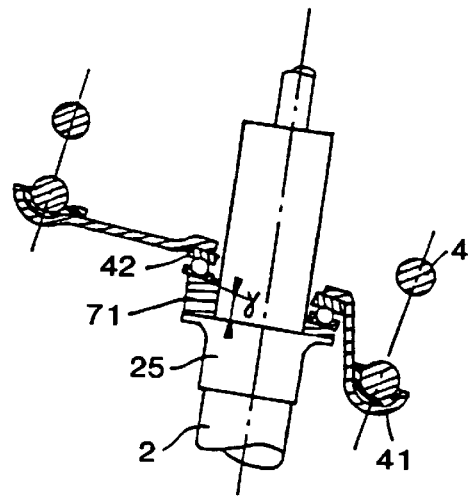

FIGS. 13 and 14 show the adjustment using a wedge 71 having a section of maximum thickness and a diametrically opposite section of minimum thickness, the thickness varying continuously between said sections, said wedge 71 supporting said lower retainer on one of its faces, and said wedge 71 being adjustable by relative rotation. This arrangement is used for instance in the case of a front axle strut in which the ball bearing 42 is located below the lower retainer 41. Of course, the use, as explained, of a wedge such as the wedge 71 for supporting the upper retainer (not shown) would also make it possible to act on the upper retainer.

Figure 15:
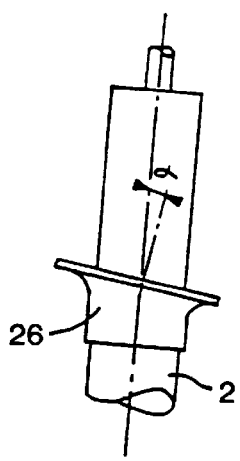

The wedge 71, the faces of which are inclined with respect to each other by an angle $\gamma$, is interposed between the lower retainer 41 and the ball bearing 42 (FIG. 13), or between the ball bearing 42 and the resting collar 25 which is integral with the body 2 of the shock absorber (FIG. 14). As a variant, the axis of the resting face of the collar 26 can be inclined by an angle $\alpha$ with respect to the axis of the body 2 of the shock absorber (FIG. 15) and could moreover support a wedge. The adjustment consists of angularly orienting the wedge 71 with respect to said retainer 41 (FIG. 13) or with respect to said body 2 (FIG. 14). The modification of said orientation makes it possible to change the inclination of the lower retainer 41 with respect to the axis of the shock absorber 2, and thus to adjust the direction of thrust of the spring 4. After adjustment, the wedge 71 will preferably be rigidly attached to the lower retainer 41 (FIG. 13) or to the resting collar 25 (FIG. 14) by means of a mechanical locking device or by bonding. The same principle of adjustment applies also to struts without ball bearing, and to struts in which the ball bearing 42 is located above the upper retainer of the spring.

Figure 16:
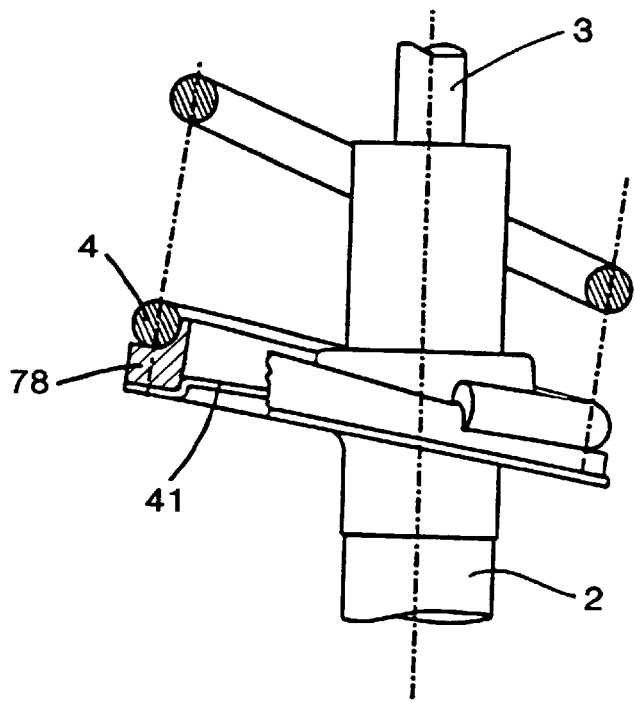
FIGS. 16 and 17 illustrate an adjustment by geometric variation of the support of the spring on the retainer.
Figure 17:
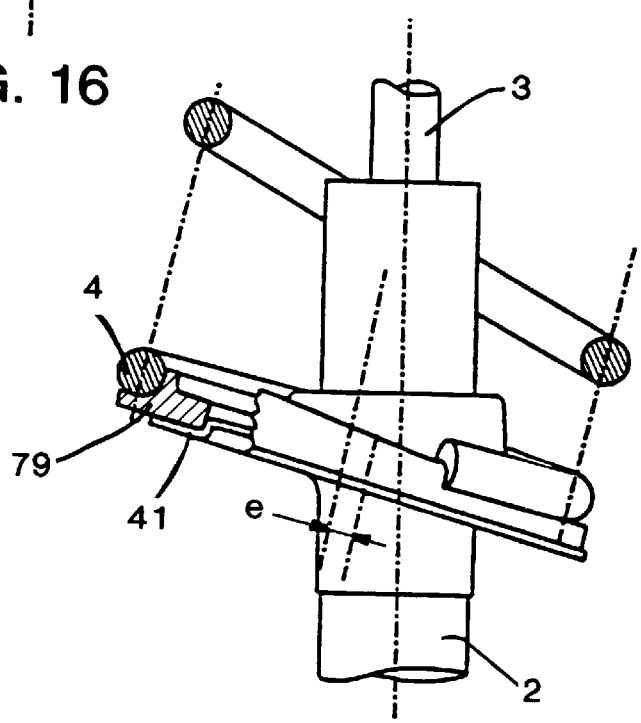

FIG. 16 illustrates a ring 78 forming a brace interposed between a spring 4 and a retainer, in this case the lower retainer 41. The seat of one of the retainers is formed by said ring 78 arranged on the periphery of said retainer 41, movable in rotation on said periphery, said ring forming a brace between the spring and said retainer, the resting surface of said ring on the retainer being a surface of revolution, said forming ring having a section of maximum thickness and a section of minimum thickness, said ring being adjustable by relative rotation with respect to said retainer. In FIG. 17, a variant is shown in which a ring 79, in addition to variable thickness, has a seat which is eccentric with respect to the resting surface on the retainer 41, which is a surface of revolution. In both cases, the adjustment is effected by relative rotation of the ring 78 or 79 with respect to the retainer 41, the spring 4 resting on the ring without relative movement. The eccentric character of the ring can also be used independently of the property of variation of thickness if the spring permits this.

In the case of a strut for a non-steering axle or steering axle in which the ball bearing is located above the upper retainer of the spring (FIGS. 18 to 21), one can also obtain a strut in which said adjustment means comprise essentially the following arrangement: The lower retainer 41 is placed on a collar 21 which is integral with the body 2 of the shock absorber, said collar forming a slideway guiding the said retainer in translation in a plane intersecting the axis of the shock absorber, said strut having means for selecting a selected relative position of said lower retainer with respect to said collar and for locking said lower retainer and said collar in the position selected.

Figures 20, 21:
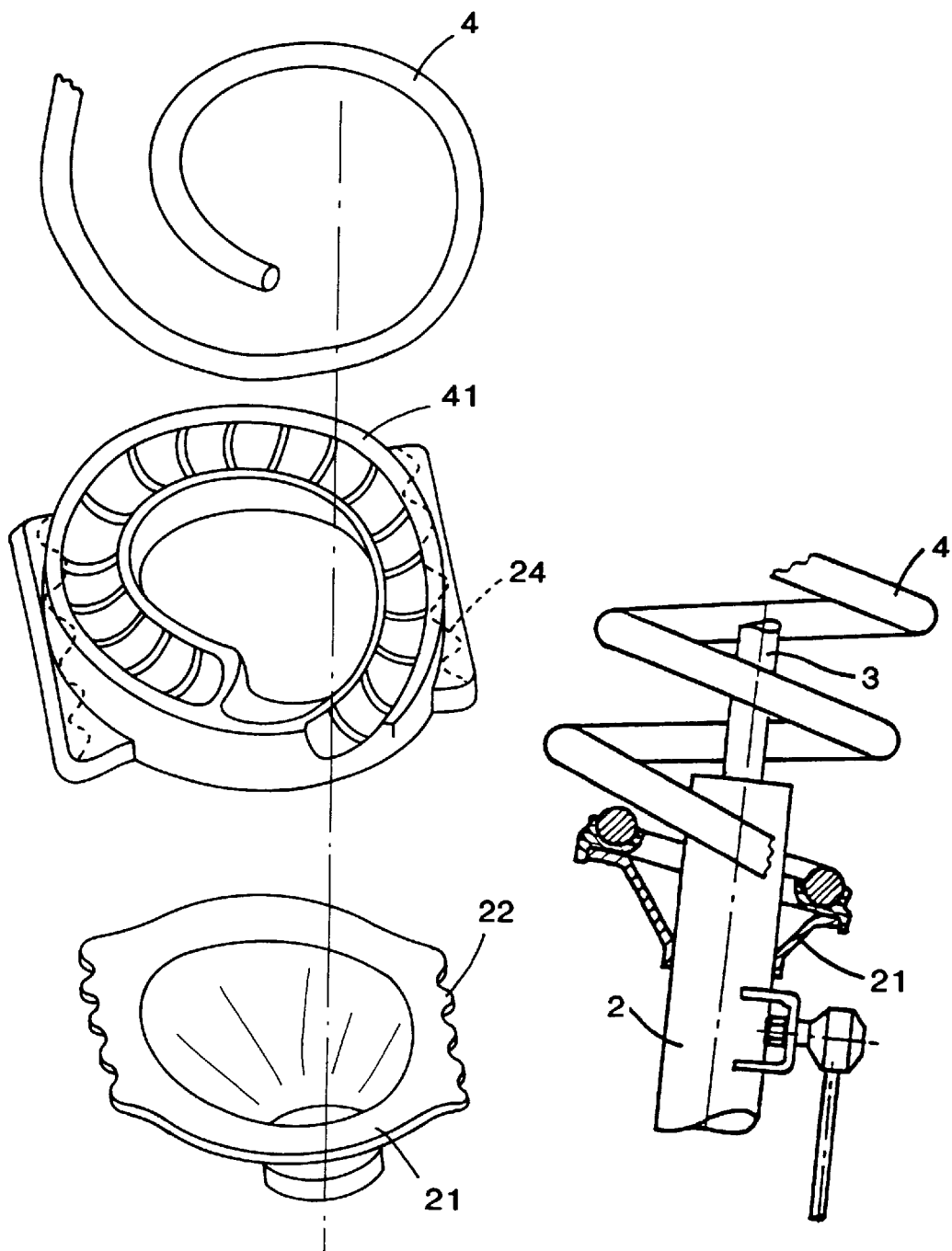

In the example described, the relative translation between lower retainer 41 and collar 21 is effected in a direction perpendicular to the plane of FIGS. 19 and 21. Teeth 22 are formed on two parallel, opposite edges of the collar 21 which forms a slideway (FIGS. 18 and 19). The teeth assure the guiding in translation (by said parallel edges) of the lower retainer 41 and permit the locking thereof in the proper relative position.

The lower retainer 41 can be produced by stamping from metal sheet (FIGS. 18 and 19). In this case, the lower retainer has two bent parallel edges. A rib 23, visible in FIG. 18, is produced in the middle of each of the bent edges. This rib 23 interlocks with the teeth 22 of the collar 21 in order to fix the relative position selected.

The lower retainer 41 can also be made by molding (FIGS. 20 and 21). This lower retainer then has two tabs 24 (FIG. 20) having on their lower face an imprint complementary to the teeth 22. This imprint engages in the teeth 22 of the collar 21 in order to fix the relative position selected.

The adjustment elements described above can be useful for making corrections, whatever the method of detecting disturbances in the behavior of the vehicle. They can be used separately or, in the case of some of them, can be combined with each other. The invention makes it possible to respect very close tolerances of the actual characteristics of struts mounted on the vehicles. The adjustment elements can be used together with a measurement, for example of the shearing force applied to the rod, such as by disconnecting the top of the rod of the upper retainer, or, more generally, from the connecting member to the body, and measuring the force necessary in order to maintain the top of the rod in its initial configuration, or by any suitable method. If one desires to act on the combined effect of the torques Cp, the measurement of the characteristics of the steering system, for instance of the torque exerted on the steering wheel in order to maintain the vehicle traveling in a straight line on a given bank, is also pertinent in order to act on the adjustment elements. There are therefore several parameters which can be measured, such as the shearing force on the rod, the moment of rotation around the pivot axis, or the torque on the steering wheel, or still other parameters if they are representative, directly or indirectly, of the operation of the struts upon actual use on the vehicle for which they are intended.

One can thus contemplate refining the adjustment of vehicles at the end of the manufacturing line. They can also be used more experimentally, by observing the influence of the adjustment, for instance due to an experience chart for each vehicle equipped with struts in accordance with the invention, and thus building up correction rules for the use of specialists on rolling trains. They can thus, in particular, be used to effect an adjustment on the vehicle, during the course of maintenance operations.

In accordance with another aspect of the invention, it is proposed to act on the struts during their manufacture, before mounting on the vehicle. The shearing force $\vec{T}$ and/or of the torque Cp are measured such as they appear on each strut when it is mounted on a vehicle. This measurement can be made upon the assembling of the strut. This measurement can be carried out under good industrial conditions by means of an apparatus such as described below, the configuration of which is controlled as a function of the characteristics of the vehicle which is to receive said strut. Depending on the result of the measurement, the means for adjusting the orientation of the force of the spring on the upper retainer are acted upon, whereupon the regulating element is locked.

Figure 22:
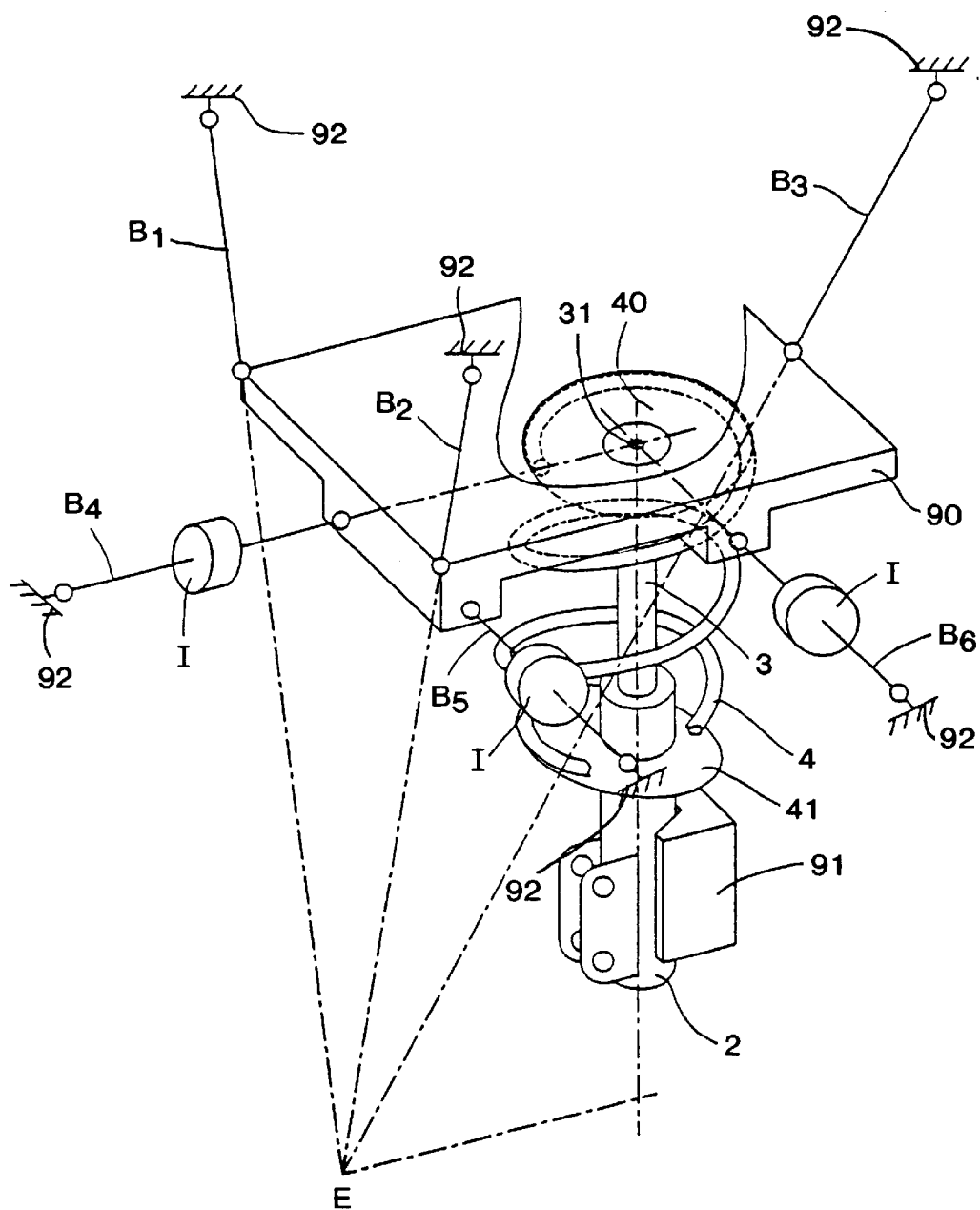
FIGS. 22, 23, and 24 illustrate three measuring benches in accordance with the invention.
Figure 23:
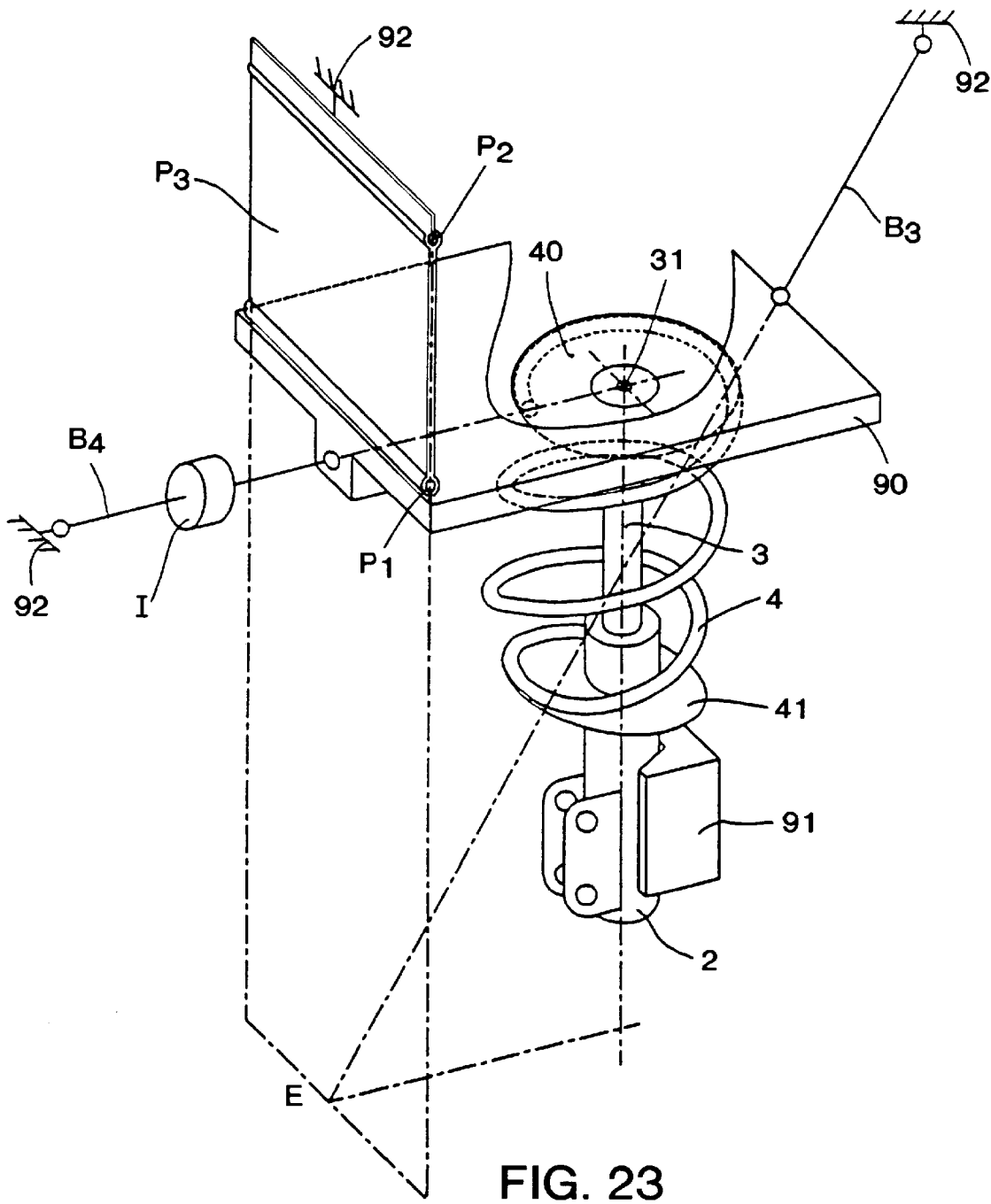
Figure 24:
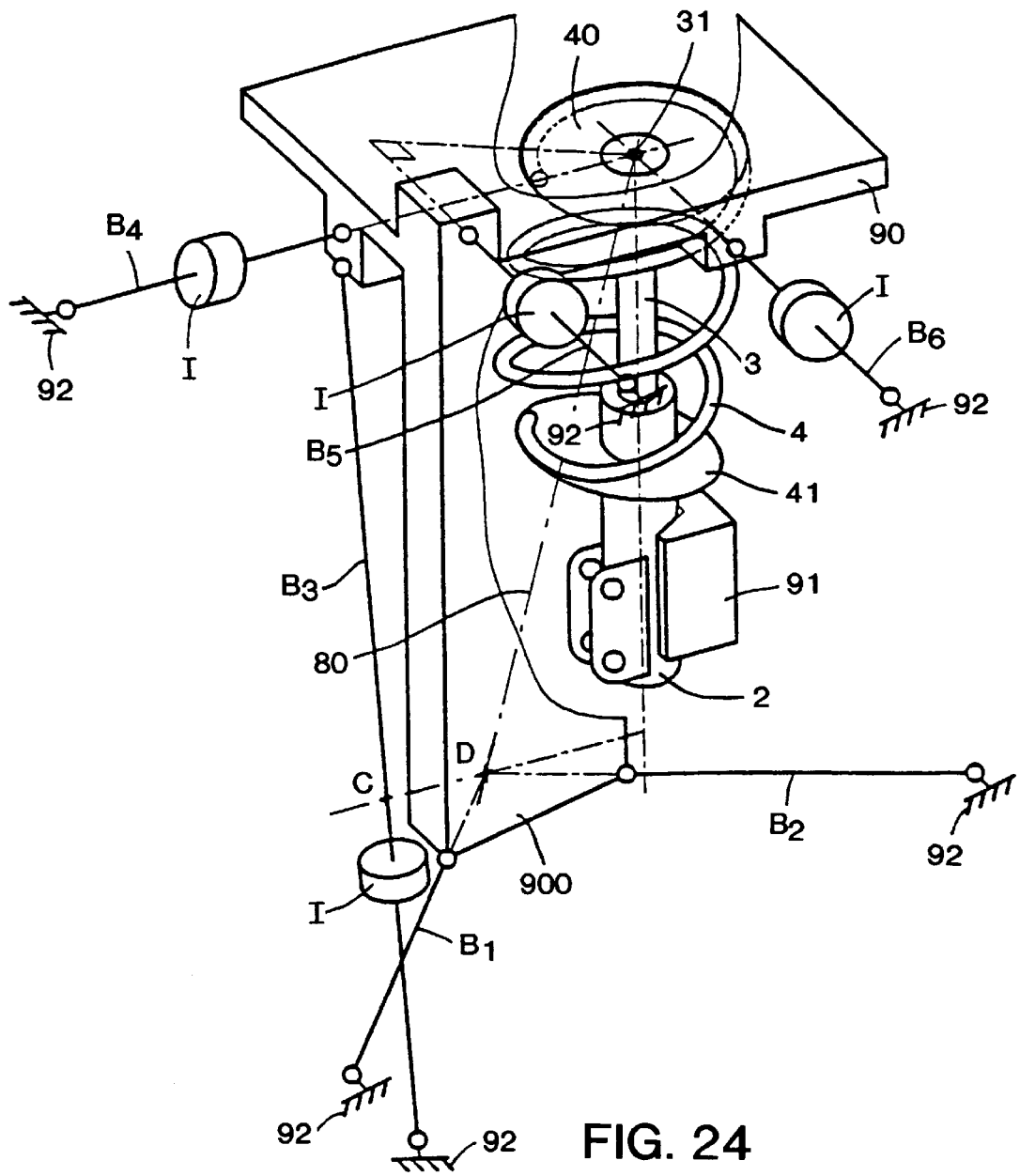

FIGS. 22, 23 and 24 illustrate a measuring bench for the strut of a MacPherson type suspension, said strut comprising:

a coupling surface intended to be mounted on a hub holder;

a connecting member intended to be mounted on the body of the vehicle, receiving said rod and forming an elastic articulation for it;

a coil spring surrounding said rod;

a lower retainer mounted on the shock absorber body and an upper retainer mounted on said connecting member, said spring being inserted between said retainers;

said bench comprising, arranged on a frame:

a plate one face of which is provided with means for coupling the connecting member, a mandrel intended to receive said body, means for moving the mandrel towards or away from the plate, configuration means for the bench as a function of the vehicle intended to receive said strut, means for measuring at least one value representative of the stresses on the connecting member.

In one particular embodiment (FIG. 22), the plate 90 is mounted on the frame 92 via a first group of three links B1, B2, B3, mounted by ball joint or equivalent elastic decoupling, which presents upon measurement the advantage of not introducing friction (localized thinning of the link), on the one hand, on the face of said plate 90 opposite the face receiving the said connecting member, and on the other hand, on the configurable recesses arranged on the frame 92 opposite said plate 90, the precise position of said recesses constituting essential said configuration means, and via a second group of three co-planar links B4, B5, B6, mounted by ball joint, on the one hand, on said opposite face of the plate and, on the other hand, on said frame, so that their plane is perpendicular to the axis of the rod, at least one of said links comprising a tensile and compressive force sensor I. Preferably at least two of said links of the second group B4, B5, B6, or all three of them, have such a sensor I.

Such a bench makes it possible to simulate the actual stressing of the strut under conditions which are extremely close to actual conditions. For this purpose, it is advisable that the three links B1, B2, B3 come together at the point E.

If one desires to measure the shearing force $\vec{T}$, the best location of E is that which corresponds to the place in space with respect to the strut where the point C is located when the strut is mounted on the vehicle for which it is intended. If it is desired to measure the torque Cp, the best location of E is that which corresponds to the place in space with respect to the strut where the point 66 (FIG. 1) is located when the strut is mounted on the vehicle for which it is intended. In both cases, a good approximation of the measurements is obtained without changing the adjustments of the bench, that is to say by proceeding with the two measurements with a single configuration of the measuring bench, if the latter is so adjusted that the point E is located on the segment connecting 66 to C.

The point E results from the geometrical characteristics of the vehicle concerned. The reader is referred to the introductory part of this specification where it is pointed out, with the assistance of FIG. 1, the locations of the points C and 66 as a function of the shape of the hub holder, the position of the articulation 65, and the size of the tires. The adjustment of the bench is effected by a mechanism which makes it possible to displace the recesses, or the bench is associated with a number of pre-adjusted cassettes which can be rapidly installed on the bench, for instance by clip engagement, each cassette corresponding to one vehicle.

Although the strut has been previously assembled, its measurement on the bench requires that the rod of the shock absorber not be connected to the upper retainer. For all struts intended to be mounted on the body via the upper retainer, it is sufficient not to mount (or to dismount) the end of the rod, and to push it into the body. In the event that the upper retainer is mounted on the end of the rod, it is advisable to provide an adaptor part having the same configuration as the top of the rod, in order to be able to mount the strut on the measuring bench, while leaving the rod of the shock absorber unstressed and pushed into the body of the shock absorber.

The strut is mounted on the plate 90 via its upper retainer 40 (or via an adapter part) precisely as it would be mounted on the body of the vehicle, that is to say in such a manner that the elastic articulation of the rod of the shock absorber (point 31) is located at a suitable place. The body 2 of the shock absorber is mounted by inserting it in the mandrel 91. The bench makes it possible to compress the spring 4 into the condition which it will have under the effect of the weight of the vehicle by relative movement of the mandrel 91 towards the plate 90 parallel to the axis of the shock absorber.

The measurement is then effected, in particular, of the shearing force. By a suitable processing of the signal delivered by the sensor or sensors, one can obtain a direct reading of the force acting at the point 31 in the plane of the plate 90. This is the shearing force which the rod would experience if it were firmly attached to the upper anchoring of the strut. The sensor I of the link B5, if the latter is provided with one, also makes it possible to measure the torque exerted by the push of the spring 4 around the axis extending from E to 31.

The result of these measurements makes it possible to effect a fine adjustment of the direction of thrust of the spring, that is to say, to regulate the vector $\vec{P}$ by acting on an adjustment element incorporated in the strut. This makes it possible to correct the shearing force in the rod, or any other component of the forces exerted by the connecting member on the plate 90. When the value desired is obtained, the adjustment element is locked, and the strut can be used on the vehicle with the assurance that its elasticity and guidance characteristics correspond actually to the optimal values.

FIG. 23 shows a variant embodiment of the measuring bench in which the plate 90 is mounted on the frame 92 via a plate P3 mounted by axis, on the one hand, on the face of said plate 90 opposite the face receiving said connecting member and, on the other hand, on the frame 92 (configurable axis) opposite said plate 90 (axes or equivalent spring rods), and via a link B3 the axis of which intersects the plane defined by the plate P3 on E, mounted ball joint on the one hand on the face of said plate opposite the face receiving said connecting member and, on the other hand, in a configurable recess arranged on the frame 92 opposite said plate 90, the determination of the position of said recess and of said configurable axis constituting essentially said configuration means, and via a second link B4 mounted by ball joint on the one hand on said plate 90 and on the other hand on said frame 92 so that said second link is perpendicular to the axis of the rod, said second link having a tensile and compressive force sensor I. The configuration of this bench is similar to that which has been explained above, and it is used in accordance with the same rules.

FIG. 24 shows another variant embodiment of the measuring bench in which the plate 90 comprises a column 900 arranged substantially parallel to the strut. It is mounted on the frame 92 via two links B1 and B2 which are arranged, with respect to the strut to be measured, in the plane of the lower suspension triangle (see arm 6 in FIG. 1). The links B1 and B2 converge at a point D which coincides with the geometrical locus of the point 66 (center of the ball joint 65 of the arm 6 in FIG. 1). The plate 90 is mounted on the frame 92 also via a link B3 arranged in the plane of the wheel, in the direction of the load $\vec{S}$. The axis of the link B3 passes through the point C. The plate 90 is mounted on the frame 92 also via links B4 and B6 located in a plane perpendicular to the axis of the shock absorber; they are perpendicular to each other and converge at the point 31. The plate 90 is mounted on the frame 92 also via a link B5 parallel to the link B6. The plane defined by the links B5 and B6 is perpendicular to the axis of the pivot 80 and intersects it at the point 31. The links B3, B4, B5 and B6 are provided with sensors I. The rod of the shock absorber not being coupled to the retainer 40, the spring is compressed in the same way as the nominal load of the vehicle would compress it. This measuring bench has the following values: B4 directly measures the shearing force transverse to the rod of the shock absorber, B5 and B6 measure the shearing force longitudinal to the rod of the shock absorber, B5 measures the torque Cp produced by the spring around the pivot axis 80, and B3 measures the vertical load seen by the wheel of the vehicle in the state of compression of the spring. The configuration of the bench is similar to that which has been explained above, acting on the anchorings of the different links on the frame.

Such a bench, therefore, comprises a first group of two links B1 and B2 which are co-planar and have axes concurrent with the pivot axis 80, substantially at the level of the center of the ball joint of the lower arm, a second group of two links B4 and B6 which are co-planar and arranged in such a manner that their plane is perpendicular to the axis of the rod at the height of said elastic articulation receiving said rod, and it furthermore comprises a link B5 which is co-planar with B6, so that the plane formed by the links B5 and B6 is perpendicular to the pivot axis 80 and intersects said pivot axis at the height of said elastic articulation, and a link B3 located in the median plane of the wheel.

It is furthermore possible to use a bench having two measurement systems such as described and which makes it possible simultaneously to receive a right strut and a left strut intended for the same vehicle. Such a bench has the advantage that it is possible to obtain, under conditions extremely close to actual conditions, a direct reading of the combined effect which these two struts exert on the steering system of the vehicle, by a suitable processing of the signal delivered by the sensors of the two measuring systems. The result of these measurements makes it possible to effect a fine adjustment of the combined effect of the two struts on the steering system by acting on an adjustment element of each of these two struts.

Figure 25:
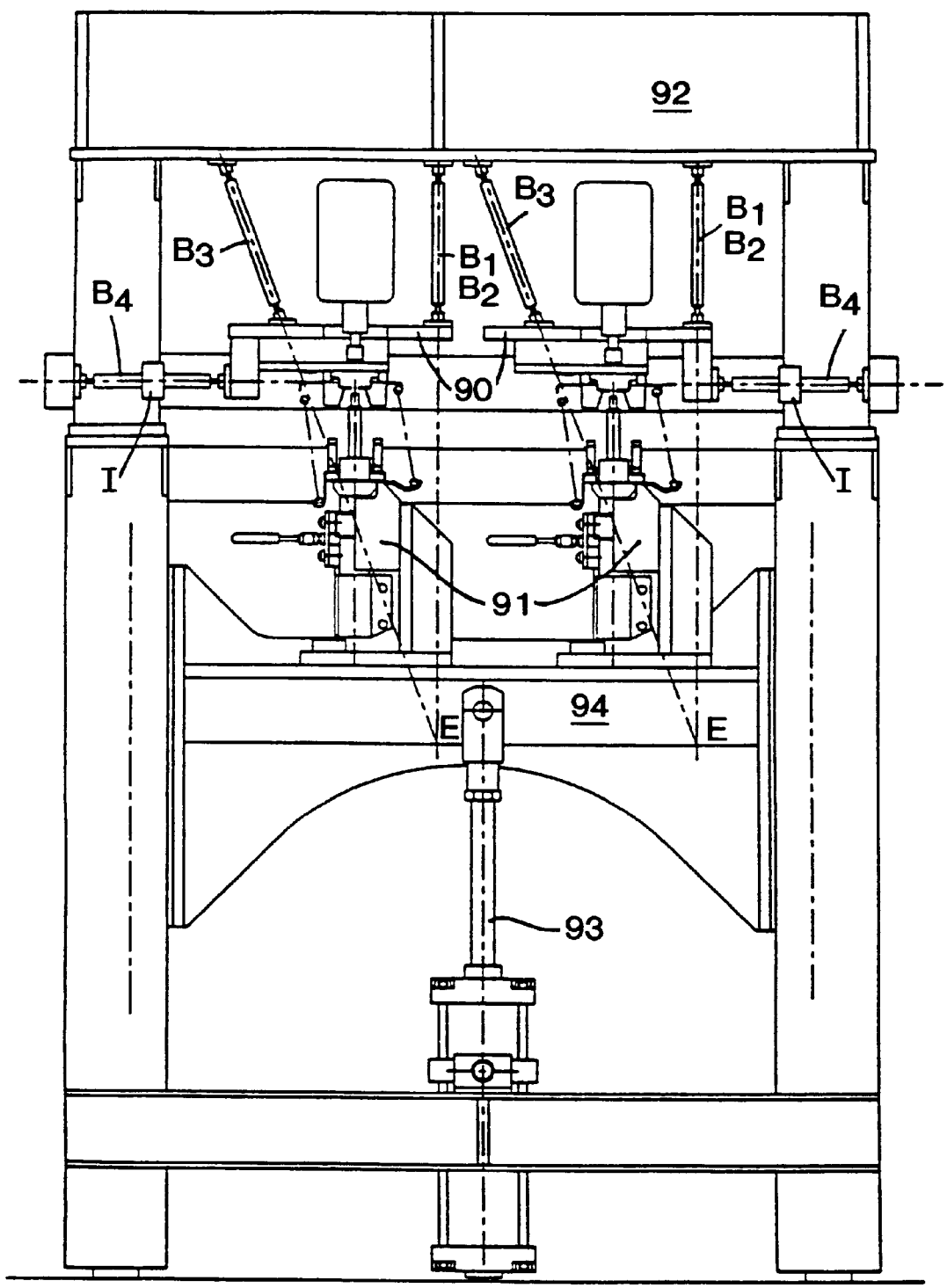
FIG. 25 illustrates a double measuring bench specific to one aspect of the invention.

An example of such an adjustment bench is shown in FIG. 25. After adjustment, these two struts are paired and mounted on the same vehicle. One sees two positions identical to what has just been described, each provided with a plate 90 and a mandrel 91. The links B1, B2, B3 are adjusted to concur at the point E, selected as a function of the geometrical characteristics of the vehicle which is to be equipped with the pair of struts. Some of these links have a tensile/compressive force sensor I as explained above. The two mandrels 91 are mounted on the cross member 94 sliding on the frame 92. The cross member 94 slides along the frame 92 under the action of the cylinder/piston device 93. In this way, the bench makes it possible simultaneously to compress the springs of each of the struts.

The invention also proposes a specific adaptation to the steering trains, illustrated in FIGS. 26 to 34. During a wheel swinging movement, actuated by the steering system connected to the hub holder 5 by a link 53 (FIG. 27) via a ball joint, the assembly consisting of strut, hub holder, hub, and wheel pivots around the pivot axis 80 defined by the points 31 and 66.

Figures 26, 27:
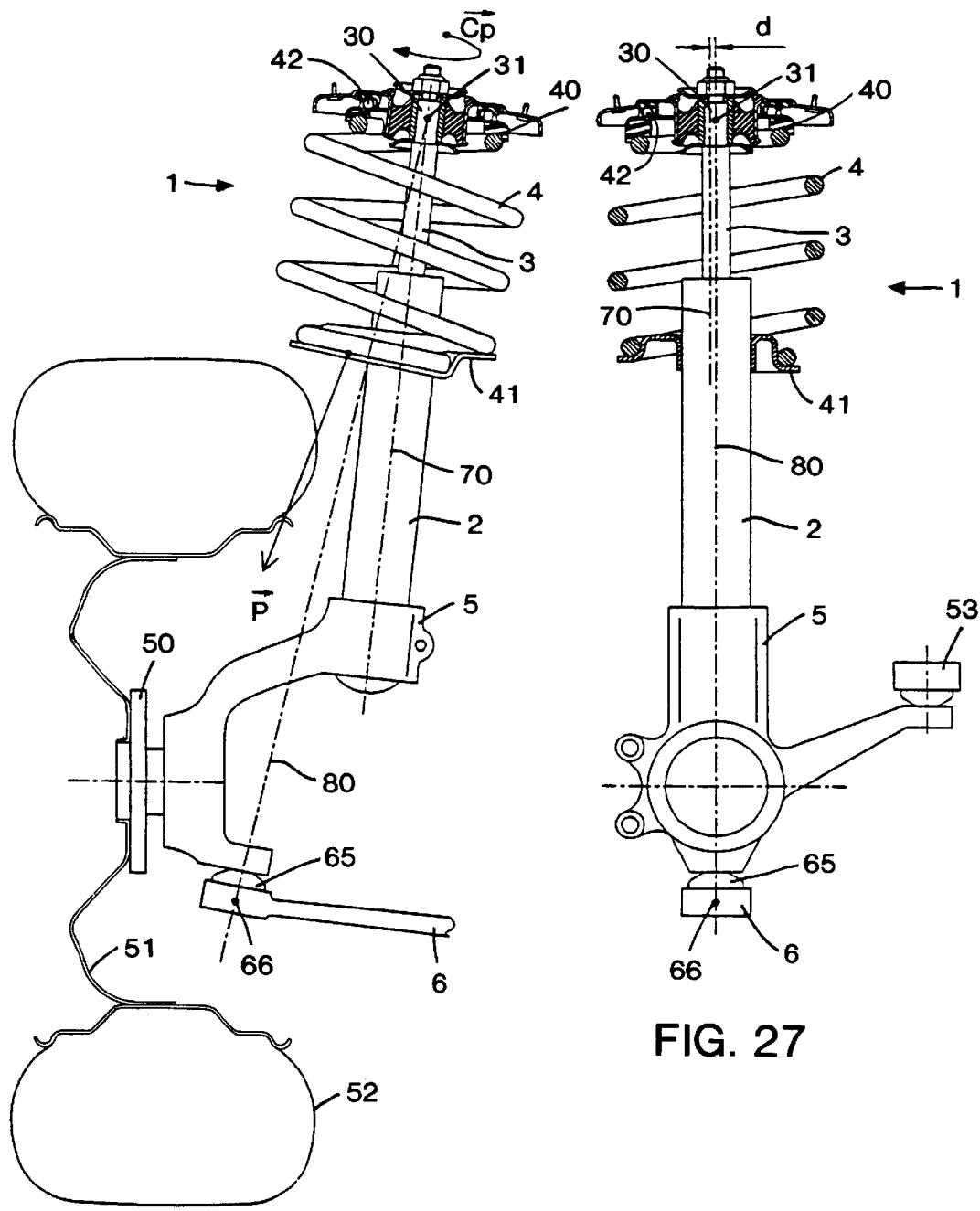
FIGS. 26 and 27 show a MacPherson suspension for a steering wheel in front and side view.

The strut 1 comprises a ball bearing 42 which makes it possible to effect swinging of the wheel without stressing the spring 4 in torsion. In fact, the thrust of the spring 4 acts between the body of the vehicle and the body 2 of the shock absorber. Said shock absorber body effects a rotation around the pivot axis 80. This ball bearing 42 can be located either between the body and the elastic articulation or between the elastic articulation and the upper retainer 40 of the spring, as shown in FIGS. 26 and 27, or between the lower retainer 41 and the body 2 of the shock absorber.

As is seen in each of these cases, the axis of rotation 70 of the ball bearing is in general different from the pivot axis 80. In all the known embodiments, these two axes intersect. In fact, the axis of the ball bearing is generally identical with the common axis of the rod 3 and the shock absorber body 2. This configuration makes it possible to limit the torque effects Cp which the thrust P of the spring can exert around the pivot axis 80 and which act on the equilibrium of the steering system via the link 53.

Despite all the efforts in design directed at further improving the behavior noted by drivers in order not only to construct very reliable vehicles but also vehicles which are pleasant to drive, numerous vehicles still today suffer from poor steering behavior. This steering behavior depends in fact on a considerable number of parameters, the influence of some of which are not well known even though they might undoubtedly be preponderant. It results from this, that although the designer has followed all the rules of the art in dimensioning the steering system, the result is not always on a par with the care which has been taken in the design.

The present invention proposes an evolution in the design of struts making it possible to control and even effect the fine adjustment of the torque effects Cp which the thrust of the spring produces around the pivot axis 80, thus making it possible better to control the influence of the struts in the behavior of the steering system without modification of the geometry (characteristic angles and offsets) of the front train. This invention therefore offers designers of suspension an additional degree of freedom in design which is entirely independent of the parameters customarily taken into account in the definition of a front axle. This additional parameter in design furthermore offers a possibility of adjustment which permits an easier adjustment of the strut and thus a shortening of the time for the development of the suspension of a future vehicle.

The strut of a MacPherson-type wheel suspension in accordance with the invention, having a shock absorber having a body and a rod, said strut, having a coil spring surrounding said rod, having a lower retainer supported by the body of the shock absorber, said lower retainer having a lower seat receiving one of the ends of said spring and an upper retainer intended to rest against the body of the vehicle, said upper retainer having an upper seat which receives the other end of said spring, said upper retainer being traversed by said rod, the shock absorber body having a surface for coupling to a hub holder cooperating with coupling means, said hub holder defining an axis of rotation of said wheel, one of the upper and lower retainers containing a ball bearing permitting the swinging of the hub holder, is characterized by the fact that the axis of said ball bearing and the pivot axis are not identical.

Figure 29:
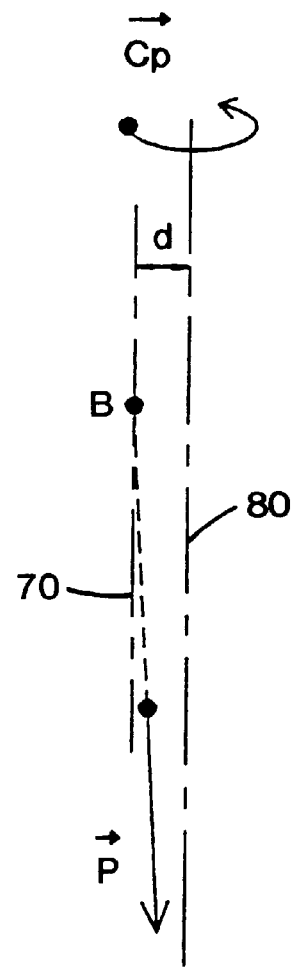
Figure 30:
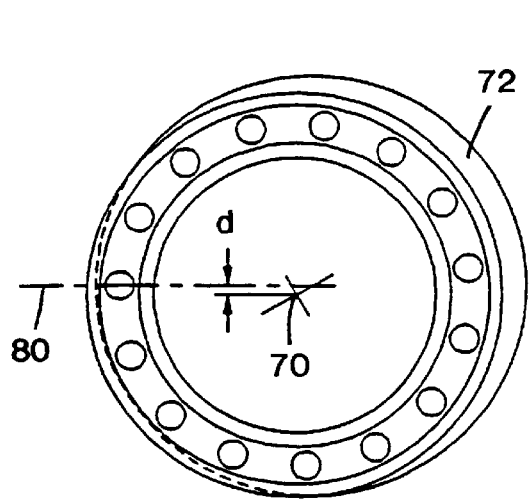
FIGS. 30, 31, and 32 illustrate one possibility of adjustment.
Figure 31:
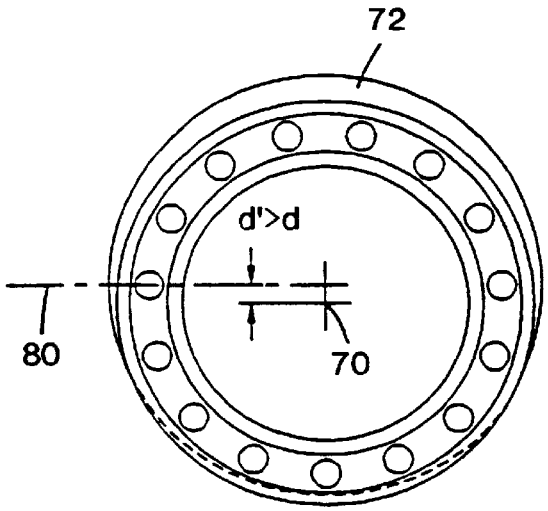
Figure 32:
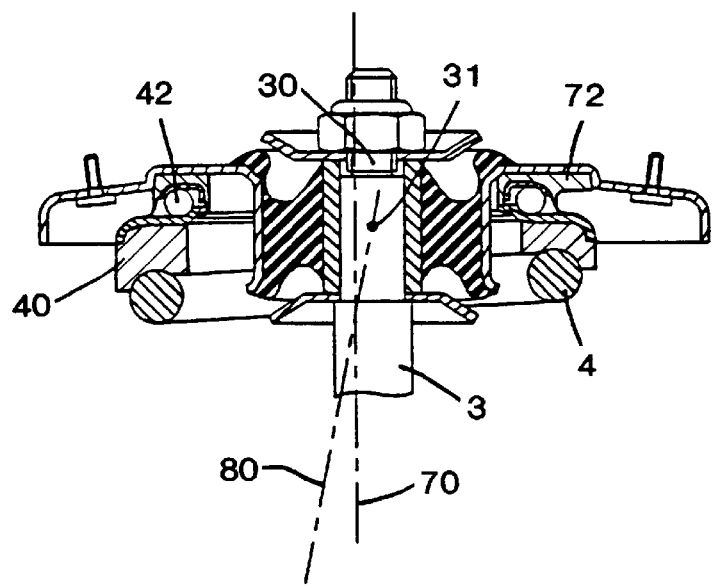

The invention thus purposes a strut for a steering wheel suspension of the MacPherson type in which the axis of rotation 70 of the ball bearing 42 is positioned in such a manner that it does not intersect the pivot axis 80. This axis of rotation will thus either be parallel to the pivot axis or not co-planar to the pivot axis. It is then possible, in both these cases, to define a distance d between these two axes. This distance d is the smallest distance measurable between two respective points of these axes. It is determined in the direction perpendicular to each of these axes, as shown in FIG. 27 or 29 in the particular case of a ball bearing 42 located above the upper retainer 40.

Figure 28:
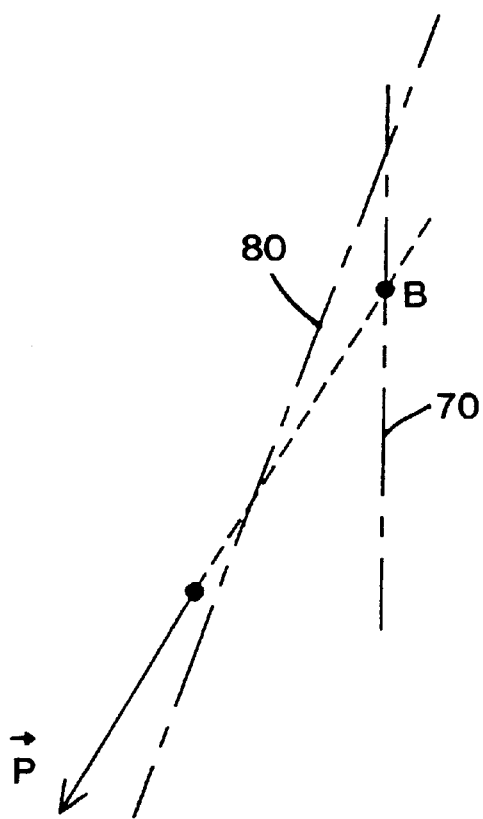
FIGS. 28 and 29 diagrammatically show the principal axes present and the principal forces.

Due to such a construction, it is possible to control the torque Cp exerted by the thrust P of the spring around the pivot axis 80, as is described below and illustrated in FIGS. 28 and 29. The combination of the two torques Cp exerted by the right and left struts thus acts on the steering system in a perfectly controlled manner.

The spring exerts a thrust force P on the lower retainer 41. This thrust $\vec{P}$ passes through the ball bearing 42. This ball bearing 42 being of very low internal friction, the thrust $\vec{P}$ of the spring exerts, under these conditions, a zero moment of rotation along the axis 70 of the bearing. This zero moment results from the fact that the direction of thrust $\vec{P}$ of the spring intersects the axis 70 of the ball bearing 42 at a point B such as shown in FIGS. 28 and 29. If, by reason of the arrangement of the strut, the direction of thrust $\vec{P}$ coming from the point B does not intersect the pivot axis 80, it results that the thrust B of the spring exerts around the pivot axis 80 a torque Cp proportional to the component of said thrust $\vec{P}$ of the spring perpendicular to the pivot axis and to the distance d previously described. The perfect control of the distance d and of its orientation makes it possible to impart a very precise value to the torque Cp.

This distance d can be defined in the design of the strut so as better to control the combined effects of the torque Cp of the right and left struts on the steering system.

In accordance with another aspect of the invention, this distance d can be adjusted. In this latter case, it becomes possible to regulate the combined action of the torques Cp of the two struts so as to correct any possible defect in behavior of the steering system found on the vehicle, whatever the method of detection. One can thus effect said adjustment by the end of the assembly line or, more experimentally, by observing the influence of said adjustment, for instance, by means of an experience chart for each vehicle equipped with struts in accordance with the invention, and by thus establishing rules for correction intended for use by specialists in drive trains. This adjustment can thus be used, in particular, to effect a possible correction in the steering behavior during the course of maintenance operations on the vehicle. It is also possible to effect the adjustment during the course of the assembling the strut, due to a bench which is capable of measuring the torque Cp. One can, for instance, use a bench such as one of those explained above. FIGS. 27, 30 to 32 illustrate an eccentric ball bearing 42. The adjustment is effected by relative rotation between a wedge 72 mounted centrally in the support directly in contact with the body of the vehicle, said wedge 72 having an eccentric recess to receive the ball bearing 42. It is seen, for example, that the axis of the thrust bearing is further from the pivot axis 80 in FIG. 31 than in FIG. 30. In this example, the adjustment is an operation carried out in the vehicle maintenance shop or upon the mounting of the strut on a measuring bench.

The means for adjusting the distance d can act by translation of the bearing without changing the orientation of its axis, for instance by orienting the upper ring 74 of the bearing 42 which is eccentric with respect to the rod 3 of the shock absorber (FIGS. 30 to 34). This adjustment will be defined in such a manner that it will modify the thrust characteristics of the spring and, in particular, its rigidity, as little as possible. Thus, the translation of the thrust bearing will be effected preferentially along a plane perpendicular to the geometrical axis of the spring and its tilting will be effected around an axis preferably intersecting the geometrical axis of the spring.

The distance d may also be adjusted during travel of the vehicle in order to correct a defect in its steering behavior as soon as such defect is detected. The defect may be noted by the driver of the vehicle. In such case, the correction effected by adjustment of the distance d will be effected by an actuator controlled by the driver of the vehicle himself. The detection of the defect can also be automatic, for instance by measurement of the torque which it is necessary to exert on the steering wheel in order to maintain the vehicle on a straight trajectory. In such case, the adjustment of the distance d can be controlled by an entirely automatic active correction system.

Figure 33:
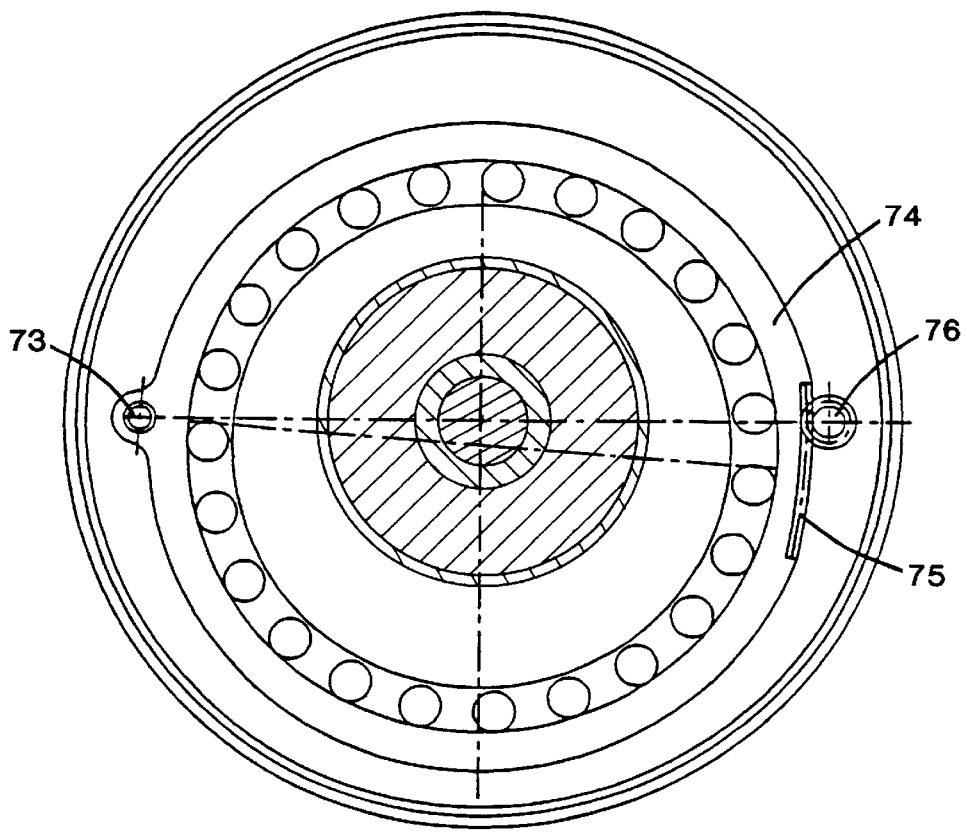
FIGS. 33 and 34 illustrate equipment for adjustment by electrical control.
Figure 34:
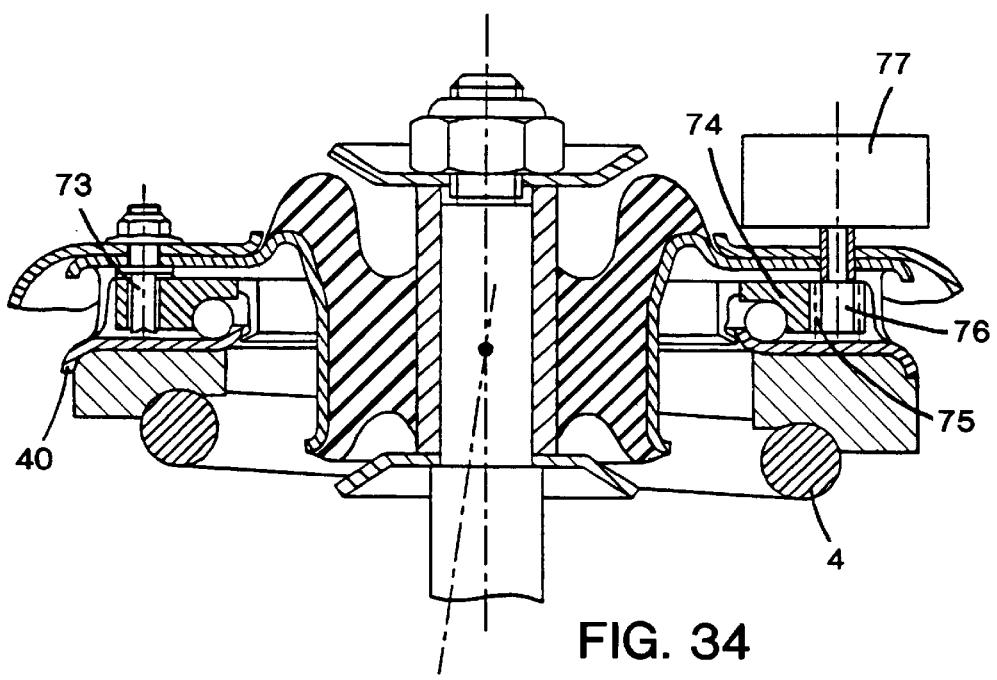

FIGS. 33 and 34 show an embodiment which includes a motorized system making it possible to vary the distance d. The upper ring 74 of the ball bearing 43 rests on a lining of low friction. This ring 74 is guided in rotation around an axis 73 perpendicular to the plane of said ring and located at a point of its periphery, and it comprises, opposite said axis, a rack 75 actuated by a pinion 76 connected to the axis of an electric motorizing system 77. This motorizing system 77 has a characteristic of non-reversibility, that is to say a torque exerted on the axis of the pinion 76 cannot cause its rotation in the absence of electric feed voltage. This motorization can be effected, for instance, by means of an electric motor coupled to a non-reversible reducer, for instance a worm system, or it can be effected by means of a piezoelectric motor which drives the pinion 75 directly.

We claim:

1. A strut of a MacPherson wheel suspension in which a shock absorber is provided with a body and a rod, said strut comprising a coil spring surrounding said rod, a lower retainer supported by the body of the shock absorber, said lower retainer having a lower seat receiving one of the ends of said spring, an upper retainer intended to rest on the body of the vehicle, said upper retainer having an upper seat receiving the other end of said spring, said upper retainer being traversed by said rod, the shock absorber body having a surface adapted to be connected to a hub holder by coupling means, said hub holder defining an axis of rotation of a wheel of the vehicle, said coupling means imposing a predetermined azimuthal position between the body and the hub holder, said strut further comprising means for adjusting the relative position of the axis of the spring with respect to said shock absorber body surface and maintaining the adjusted position during the service of the strut.

2. A strut according to claim 1, in which said adjustment and adjustment maintaining means comprise an arrangement in which said lower retainer is mounted on the shock absorber body via an eccentric which is adjustable in rotation.

3. A strut according to claim 1, in which said adjustment and adjustment maintaining means comprise an arrangement in which one of the retainers rests on a wedge having a pair of faces, said wedge comprising a section of maximum thickness and a section of minimum thickness diametrically opposite each other, the thickness varying continuously between said sections, said wedge supporting said retainer on one of its faces, said wedge being adjustable by relative rotation.

4. A strut according to claim 3, in which said retainer is the lower retainer, said wedge receiving the lower retainer on one of its faces, the other face of said wedge being mounted on a supporting collar integral with body of the shock absorber.

5. A strut according to claim 1, in which said adjustment and adjustment maintaining means comprise a ring forming the seat of one of the retainers, the ring being arranged on the periphery of said retainer and movable in rotation on said periphery, said ring providing a support for the spring on said retainer, the resting surface of said ring on the retainer being a surface of revolution, said ring having a section of maximum thickness and a section of minimum thickness, said ring being adjustable by rotation relative to said retainer.

6. A strut according to claim 1, in which said adjustment and adjustment maintaining means comprise a ring forming an eccentric, the ring providing the seat of one of the retainers and having a mounting face on said retainer, said ring being adjustable by rotation relative to the retainer.

7. A strut according to claim 1, in which said adjusting and adjustment maintaining means include means for indexing the relative orientation of the body of the shock absorber with respect to the hub holder, the adjustment being obtained by rotation of said shock absorber body relative to the hub holder.

8. A strut according to claim 1, in which said adjustment and adjustment maintaining means comprise a collar which is integral with the body of the shock absorber, said collar forming a slideway guiding said lower retainer in translation in a plane intersecting the axis of the shock absorber, said strut comprising means for selecting a relative position of said lower retainer with respect to said collar and for locking said lower retainer and said collar in the position selected.

9. A strut of a MacPherson wheel suspension, comprising a shock absorber provided with a body and a rod, said strut having a coil spring surrounding said rod and a lower retainer supported by the body of the shock absorber, said lower retainer having a lower seat receiving one of the ends of said spring, and an upper retainer intended to rest on the body on the vehicle, said upper retainer having an upper seat receiving the other end of said spring, said upper retainer being traversed by said rod, the shock absorber body having a surface for coupling to a hub holder, said hub holder defining an axis of rotation of a wheel mounted on the vehicle, one of the upper and lower retainers containing a ball bearing permitting the swinging of the hub holder, the axes of said ball bearing and the pivot axis being spaced apart, and means for adjusting the distance between the axis of said ball bearing and the pivot axis and maintaining the adjusted distance during the service of the strut.

10. A strut according to claim 9, in which said adjusting and adjustment maintaining means comprise an upper ring of the ball bearing resting on a lining of low friction, said ring being guided in rotation around an axis perpendicular to the plane of said ring and located at a point on its periphery, and comprising opposite said axis a rack which is actuated by a pinion connected to the axis of an irreversible electric motorizing system.

* * * * *